Dec. 26, 1933.  H. LEHRECKE  1,940,758
PROCESS FOR BURNING PHOSPHORUS
Filed Nov. 29, 1930
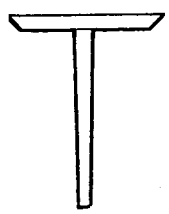
Fig. Ia.
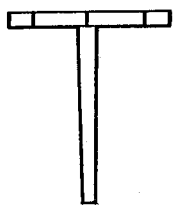
Fig. IIa.
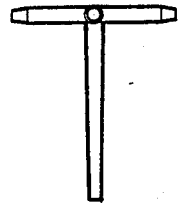
Fig. IIIa.
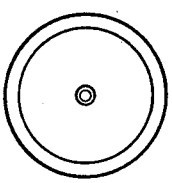
Fig. Ib.
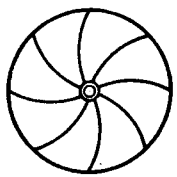
Fig. IIb.
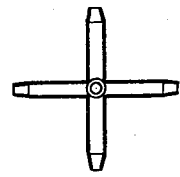
Fig. IIIb.
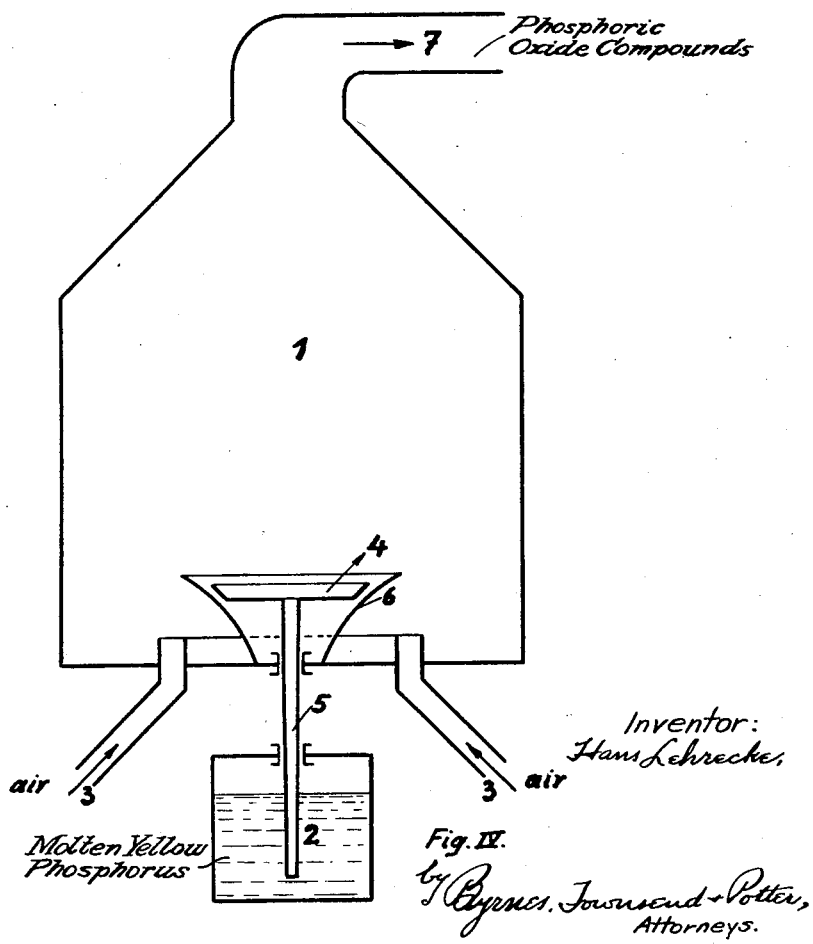
Fig. IV.
Inventor:
Hans Lehrecke,
by Byrnes, Townsend & Potter,
Attorneys.

Patented Dec. 26, 1933

1,940,758

UNITED STATES PATENT OFFICE 1,940,758

PROCESS FOR BURNING PHOSPHORUS

Hans Lehrecke, Frankfort-on-the-Main, Germany, assignor to Metallgesellschaft Aktiengesellschaft, Frankfort-on-the-Main, Germany, a corporation of Germany Application November 29, 1930, Serial No. 499,075, and in Germany November 29, 1929

4 Claims. (Cl. 23—165)

This invention relates to a process and apparatus for burning yellow phosphorus for the production of phosphorus oxide and phosphoric acid.

Heretofore phosphorus has been burned e. g. by atomizing the molten phosphorus through suitable nozzles and burning it in an oxygen-containing gas, such as air. The use of nozzles, however, involves serious difficulties. For example, the nozzles become clogged due to impurities contained in the phosphorus or due to the conversion of the yellow phosphorus to red phosphorus and deposition of the latter. This occurs as a result of the nozzles becoming too highly heated by the phosphorus flame. In the use of nozzles it is also necessary either to supply the molten phosphorus to the nozzles under sufficient pressure to produce the desired atomizing effect, which involves mechanical difficulties, or to supply the oxygen-containing gas to the nozzles under sufficiently high pressure to produce the necessary atomizing effect, which results in an intense flame and overheating of the nozzles.

All of these difficulties are overcome by the present invention according to which the molten phosphorus is disintegrated by mechanical means, such as a rotating cone or plate, revolving beaters or the like. For instance, the molten phosphorus may be fed upon a rapidly rotating disk. It may be simply flowed or it may be squirted upon the disk. Or a rotating horizontal disk carried upon a vertical hollow shaft projecting upwardly through the bottom of the combustion chamber may be supplied with phosphorus through said hollow shaft. In such an apparatus the danger of stoppage, as in the case of nozzles, can be completely eliminated.

Overheating of such a device either does not occur or may be prevented very simply. For instance, the air required for the combustion of the phosphorus can be introduced into the combustion chamber in such manner, e. g., from below, that it strikes the lower surface of the disk and passes upward around its edges thereby cooling it. The cooling action of the air supply may be more effectively utilized by surrounding the horizontal rotating disk by a funnel-shaped shell or housing so that the atomized phosphorus mixes with the air supply only above the upper end of the shell and substantially no combustion takes place in close proximity to the disk.

The disk can be given a variety of shapes to produce the desired atomizing effect. For example, the edge of the disk can be bent up at any desired angle. The melted phosphorus can simply be flowed upon the disk without pressure, the rotation of the disk serving to produce the desired sub-division of the phosphorus. If the rotating disk will be supplied with molten phosphorus by introducing it through the hollow vertical shaft as mentioned above the phosphorus will be sucked up by the centrifugal power of the rotating disk. Therefore in this case no pressure at all will be necessary to introduce the phosphorus.

It is possible in these manners to obtain a finer subdivision of the phosphorus than is possible by the use of nozzles. By varying the shape of the disintegrating means one may extend the zone of combustion. Any such regulation with the use of nozzles is practically impossible because in any event the principal burning of the phosphorus always occurs in a relatively small space adjacent to the nozzle opening.

I have found it to be advantageous in the above-described procedure to supply regulated quantities of water to the flame, for instance, by feeding the water in to the atomizing means along with the phosphorus so that the phosphorus is sprayed together with the water in a fine mist. Thus the temperature of the phosphorus flame is reduced due to the consumption of heat for vaporizing the water, and besides, instead of phosphorus-pentoxide, phosphoric acid of a concentration depending upon the quantity of water supplied is recovered.

The apparatus referred to in the foregoing description, capable of carrying out the described process, is illustrated in the accompanying drawing.

Figures 1a, 1b, 2a, 2b, 3a and 3b show different forms of the rotating devices for the distribution of phosphorus as described in this patent application, in elevation and ground plan.

Figures 1a and 1b show a round disk, the edge of the disk being bent up at an angle of about 45 degrees.

Figures 2a and 2b show another shape of the rotating disk, consisting of a plate with radial shovels similar to the wheel of a centrifugal pump.

The rotating device according to Figures 3a and 3b consists of a cross or a star of different tubes, rotating horizontally around their central shaft. The ends of the tubes are open. Another form of this device has open channels instead of the tubes forming the cross or the star.

In all shapes of rotating devices as shown in Figures 1 to 3, the rotating shaft may be hollow so that the molten phosphorus or a mixture of phosphorus and water can enter through this shaft. Otherwise it may be made of a rod of metal or any other suitable material, the phosphorus being squirted upon the centre of the disk from above in the form of a jet of molten phosphorus or phosphorus and water.

For introducing molten phosphorus and water separately, the rotating shaft of the disk can consist of two concentric tubes, the phosphorus being introduced through the inner tube and the water between inner and outer tube.

The form of the disks may of course vary without going beyond the principle of this invention.

Figure 4 shows a complete installation for burning phosphorus according to this invention. It comprises the combustion chamber (1), the phosphorus supply (2), the air supply (3), the rotating disk (4) with its shaft (5), a frustro conical shell (6) and the outlet for the products of combustion (7).

The molten phosphorus or a mixture of molten phosphorus is introduced into the tank (2) from which it is either sucked up by the rotating disk through the hollow shaft (5) or introduced by pressure into the shaft and thus on to the surface of the disk (4). As explained already, this shaft may consist of two concentric tubes, whereby phosphorus and water can, if desired, be introduced separately.

Through the inlets (3) which are built preferably in form of a ring, air is introduced under pressure into the combustion chamber (1). The air passes between the frustro conical shell (6) and the walls of the combustion chamber. Here it gets into contact with the spray of phosphorus or of phosphorus and water evolving from the rotating disk (4), the phosphorus igniting immediately in this zone and burning completely with the excess of air in the upper part of the combustion chamber (1). The combustion gases consisting of phosphorus-pentoxide, phosphoric acid, nitrogen and a surplus of oxygen, leave the combustion chamber through the outlet (7) and pass from there to the absorbing system.

I claim:

1. Process of burning phosphorus which comprises feeding molten yellow phosphorus into contact with a swiftly rotating surface and mixing the resulting spray with an oxygen-containing gas and burning the mixture.

2. Process of burning phosphorus which comprises feeding molten yellow phosphorus into contact with a swiftly rotating surface of a solid body, contacting a relatively cool oxygen-containing gas with said body to cool the same and thereafter mixing said gas with the spray of phosphorus formed by the action of said body and burning the mixture.

3. Process of burning phosphorus which comprises disintegrating molten yellow phosphorus, mixing the resulting spray of phosphorus with an oxygen-containing gas carrying atomized water and burning the mixture.

4. Process of burning phosphorus which comprises simultaneously atomizing molten yellow phosphorus and water by contact with a swiftly rotating surface of a solid body into an oxygen-containing gas and burning the resulting mixture.

HANS LEHRECKE.